United States Patent [19]

Saito

[11] Patent Number: 4,541,033

[45] Date of Patent: Sep. 10, 1985

[54] POWER SWITCH ASSEMBLY HAVING A CIRCUIT BREAKER AND A CIRCUIT DISCONNECTOR

[75] Inventor: Toru Saito, Nishinomiya, Japan

[73] Assignee: S. Soga & Co., Tokyo, Japan

[21] Appl. No.: 560,990

[22] Filed: Dec. 13, 1983

[30] Foreign Application Priority Data

Dec. 16, 1982 [JP] Japan .............................. 57-222509
Apr. 29, 1983 [JP] Japan .............................. 58-76706

[51] Int. Cl.[3] .............................. H02B 5/00

[52] U.S. Cl. .............................. 361/333; 361/335; 361/429; 361/131; 361/132; 200/48 R

[58] Field of Search .............................. 361/131, 132, 331-335, 361/340, 376, 417, 419, 420, 428, 429; 200/48 R, 48 P, 50 AA, 50 R, 148 R, 148 B; 307/113, 150

[56] References Cited

U.S. PATENT DOCUMENTS

| | | | |
|---|---|---|---|
| 3,364,398 | 1/1968 | Stipcevich | 361/429 |
| 3,787,711 | 1/1974 | Bright | 361/333 |
| 4,360,849 | 11/1982 | Harris | 361/333 |
| 4,367,512 | 1/1983 | Fujita | 361/335 |

FOREIGN PATENT DOCUMENTS 0011973 6/1980 European Pat. Off. .

OTHER PUBLICATIONS

Nisshin Denki Giho; vol. 26, No. 4 (Oct. 1981), pp. 20-22.

*Primary Examiner*—G. P. Tolin
*Attorney, Agent, or Firm*—Wenderoth, Lind & Ponack

[57] ABSTRACT

A power switch assembly has a horizontal supporting base, a circuit disconnector including a first supporting porcelain insulator vertically disposed on the supporting base, a stationary contactor supported by the free end of the first insulator, and a rod-shaped movable contactor separably engaged by the stationary contactor and pivotally secured to an operating mechanism located within a hollow terminal disposed at the free end of a second supporting porcelain insulator vertically disposed on the supporting base, and a circuit breaker disposed on the hollow terminal to be tilted to be remote from the movable contactor, while two driving rods extend through the second insulator and are connected to the driving source to open and close the circuit disconnector through the operating mechanism and the circuit breaker through a linkage located within the hollow terminal. The power switch assembly may have further a porcelain clad lightning arrester substituted for the first insulator.

9 Claims, 2 Drawing Figures

POWER SWITCH ASSEMBLY HAVING A CIRCUIT BREAKER AND A CIRCUIT DISCONNECTOR

BACKGROUND OF THE INVENTION

This invention relates to a power switch assembly and more particularly to improvements in both a power switch assembly comprising a circuit breaker and a circuit disconnector, and a power switch assembly comprising a lightning arrester, a circuit breaker and a circuit disconnector.

A conventional power switch assembly has typically comprised a circuit breaker and a circuit disconnector each mounted separately and electrically connected to each other by copper or aluminum conductors. The disconnector has consisted of a first and a second supporting porcelain insulator disposed at both ends of a horizontal supporting base with a stationary contactor, and line-receiving terminal mounted atop the first supporting insulator, and a movable, rod-shaped contactor supported by the second porcelain insulator and operably connected to a disconnector driving mechanism mounted atop a driving porcelain insulator which is disposed linearly at a predetermined distance between the first and second supporting insulators. This driving porcelain insulator is driven by a driving source through a driving mechanism to cause the movable contactor to engage with and disengage from the stationary contactor.

Also, the circuit breaker has been disposed apart from that side of the supporting base having the second porcelain insulator. The circuit breaker has comprised an operating mechanism disposed on a floor or the ground, a supporting porcelain insulator vertically disposed on the operating mechanism, and a porcelain clad main body of the circuit breaker mounted atop the supporting porcelain insulator having one terminal interposed therebetween. The main body of the circuit breaker has been connected at the one terminal to the movable contactor through a connecting lead and the other terminal has been connected to a feed line.

There is also known another power switch assembly comprising, in addition to the circuit breaker and disconnector as described above, a lightning arrester. The lightning arrester has typically been vertically disposed on a separate horizontal supporting base located on that side of the first-mentioned supporting base remote from the circuit breaker with a certain spacing formed therebetween. This lightning arrester has typically included a terminal located at the upper end thereof which is connected to the receiving line and via a connecting lead to the terminal of the circuit disconnector disposed on the first supporting porcelain insulator. The lightning arrester, the circuit disconnector and the circuit breaker are aligned with and spaced from one another.

In the last-mentioned power switch assembly, the lightning arrester, the circuit disconnector and the circuit breaker have been separately installed on a floor or the ground. Thus, it has been required to maintain a predetermined electrically insulating spatial distance between an electrically charged or grounded portion of each of the lightning arrester, the circuit disconnector and the circuit breaker and grounded or an electrically charged portion of an adjacent one thereof respectively. This has resulted in an increase in floor area required for the power switch assembly to be installed.

On the other hand, the first-mentioned power switch assembly is generally so large-scaled that the same is installed on a floor or the ground by several persons. Thus, in order to easily effect both the installation of the circuit disconnector, and circuit breaker and the electrical connection of the circuit disconnector to the one terminal of the circuit breaker, it has been a common practice to sufficiently space the circuit from the circuit breaker.

Furthermore, with the increased utilization of gas insulated switch assemblies comprising the circuit disconnector and breaker accommodated in a single gas filled container, developments of move compact power switch assemblies comprising the circuit disconnector and breaker formed independently of each other have also been required to compete with the gas insulated switch assembly. This requirement can be met by power switch assemblies comprising the circuit disconnector and breaker as described above arranged close to each other thereby to decrease a distance therebetween. This measure has resulted in an objection that an electrically insulating spatial distance cannot be maintained between the circuit disconnector and breaker because of a decrease in each of distances between the supporting base put at a ground potential for the circuit disconnector and the one terminal put at a high potential of the circuit breaker and between a driving mechanism of the circuit disconnector and the other terminal of the circuit breaker brought into different potentials upon the opening of the circuit breaker. Thus, it is actually impossible to so decrease the distance between the circuit disconnector and breaker resulting in a fairly broard space necessarily being left therebetween.

Accordingly, it is an object of the present invention to provide a new and improved power switch assembly comprising a circuit breaker and a circuit disconnector installed in a small floor area with electrically insulating spatial distances satisfactorily maintained among the components put at different potentials and affording easier installation and electrical connection while having a sufficiently simple construction to be inexpensive and easily transported.

It is another object of the present invention to provide a new and improved power switch assembly comprising a circuit breaker, and a circuit disconnector and a lightning arrester installed in a small floor area with an electrically insulating spatial distance satisfactorily maintained between adjacent ones thereof while having a sufficiently simple construction to be inexpensive and easily transported.

SUMMARY OF THE INVENTION

According to one aspect thereof, the present invention provides a power switch assembly composed of a circuit disconnector and a circuit breaker disposed adjacent and electrically connected to each other, comprising a horizontal supporting base, a first supporting porcelain insulator vertically disposed on the horizontal supporting base, and including a stationary contactor and a terminal of the circuit disconnector disposed at the free end of the first supporting porcelain insulator, a second supporting porcelain insulator vertically disposed on the horizontal supporting base to leave a predetermined distance between the first and second supporting porcelain insulators, the second supporting porcelain insulator including a movable contactor of the circuit disconnector disposed at the free end thereof, and a breaking portion of the circuit breaker disposed at the free end of the second supporting porcelain insulator.

According to another aspect thereof, the present invention provides a power switch assembly composed of a lightning arrester, a circuit disconnector and a circuit breaker comprising a horizontal supporting base, the lightning arrester vertically disposed thereon, the circuit disconnector including a supporting porcelain insulator vertically disposed on the horizontal supporting base to be parallel to and spaced from the lightning arrester, a stationary contactor disposed at the free end of the lightening arrester and a movable contactor mounted on the free end of the supporting porcelain insulator, the circuit breaker disposed at the free end of the supporting porcelain insulator, and a pair of operating mechanisms disposed below the supporting porcelain insulator to operate said circuit disconnector and said circuit breaker, respectively.

In each of the power switch assemblies, the circuit breaker may be preferably disposed at the free end of the supporting porcelain insulator to be tilted so as to be remote from the movable contactor of the circuit disconnector.

Also, a pair of driving rods may extend in parallel relationship through the supporting porcelain insulator for actuating a driving mechanism for the circuit disconnector and for selectively putting the circuit breaker in its closed and open positions, respectively.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
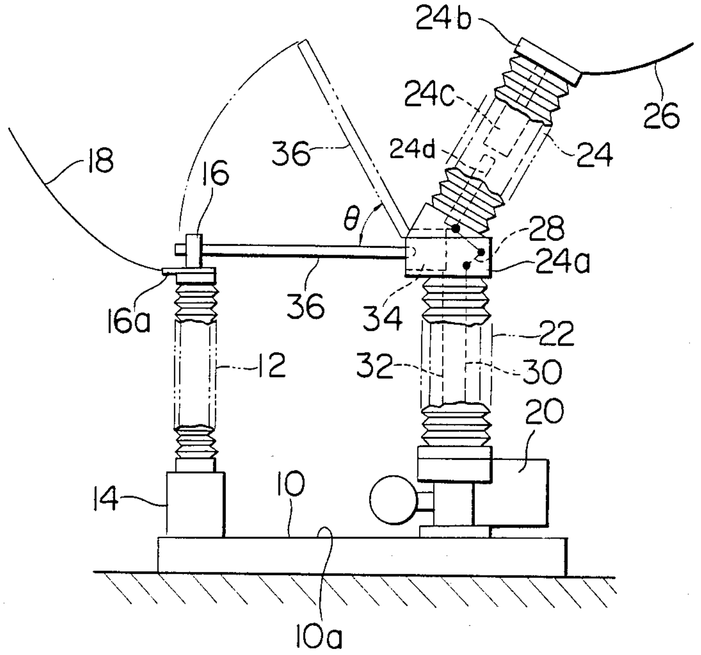
FIG. 1 is a side elevational view of one embodiment of the present invention applied to a power switch assembly comprising a circuit disconnector and a circuit breaker, with parts illustrated schematically.

Referring now to FIG. 1 of the drawing, there is illustrated one embodiment according to the power switch assembly of the present invention comprising a circuit disconnector and a circuit breaker electrically connected to each other in accordance with one aspect thereof. The arrangement illustrated comprises a horizontal supporting base 10 including an upper surface 10*a* as viewed in FIG. 1 made flat, a first supporting porcelain insulator 12 vertically disposed at one end, in this case, the lefthand end as viewed in FIG. 1 of the upper flat surface of the supporting base 10, through an adapter 14 directly disposed at that lefthand end of the upper flat base surface 10*a* for adjusting the height of the upper end of the first supporting porcelain insulator 12 and a U-shaped stationary contactor 16 of a circuit disconnector disposed at the upper end of the first supporting porcelain insulator 12 through one terminal 16*a* of the circuit disconnector fixed to the upper end of the porcelain insulator 12 and connected to the stationary contactor 16 and also to a receiving line 18.

Also, a driving source 20 for the circuit disconnector and a circuit breaker is disposed on the upper flat surface 10*a* of the supporting base 10 to be spaced from the adapter 14 by a predetermined distance, and a second supporting porcelain insulator 22 vertically disposed on the driving source 20. Thus the second supporting porcelain insulator 22 is spaced from the first supporting porcelain insulator 12 by a predetermined distance. The driving source 20 may comprise an electric motor and the second supporting porcelain insulator 22 is greater in inside diameter than the first supporting porcelain insulator 12.

As shown in FIG. 1, a porcelain clad, gas insulated circuit breaker includes one terminal 24*a* in the form of a short hollow cylinder disposed at the upper end as viewed in FIG. 1 of the second supporting porcelain insulator 22 with its longitudinal axis perpendicular to the longitudinal axis of the porcelain insulator 22, a porcelain clad, gas insulated breaking portion 24 in the form of a hollow cylinder connected to the terminal 24*a* to be tilted to form an angle with the longitudinal axis of the porcelain insulator 22 to be remote from the first supporting porcelain insulator 12 or the stationary contactor 16 and another terminal 24*b* disposed at the free end of the breaking portion 24 and connected to a feeder line 26. In FIG. 1 a pair of stationary and movable contacts 24*c* and 24*d* respectively are shown as being disposed in opposite spaced relationship within the interior of the breaking portion 24, which is filled with an electrically insulating gas (not shown). The stationary contact 24*c* is connected to the other terminal 24*b* and the movable contact 24*d* is connected to the one hollow terminal 24*a* and also mechanically connected to a linkage 28 disposed within the hollow terminal 24*a*. Then, as shown in FIG. 1, the linkage 28 is connected to an upper end as viewed in FIG. 1 of a breaker driving rod 30 of an electrically insulating material extending through the interior of the second supporting porcelain insulator 22 to be parallel to the longitudinal axis thereof and connected at the other end to the driving source 20. The driving rod 30 is arranged to be moved vertically or in parallel to the longitudinal axis of the second supporting porcelain insulator 22 to engage and disengage the movable contactor 24*d* with and from the stationary contact 24*c*.

Also, a disconnector driving rod 32 of an electrically insulating material extends through the interior of the common supporting porcelain insulator 22 to be parallel to the breaker driving rod 30. As shown in FIG. 1, the driving rod 32 is connected at the upper end as viewed in FIG. 1 to a disconnector driving mechanism 34 disposed within and electrically connected to the hollow terminal 24*a* and at the lower end to the driving source 20. The driving mechanism 34 is operatively connected to one end of a rod-shaped movable contactor 36 having the other end arranged to engage with and disengage from the stationary contactor 16 disposed on the upper end of the first supporting porcelain insulator 12. To this end, the disconnector driving rod 32 is arranged to be rotated about the longitudinal axis thereof to rotate the movable contactor about the pin connection of the rod 32 and the operating mechanism 34 thereby to change the movable contactor 36 from its closed position shown at solid line in FIG. 1 to its open position shown at broken line in FIG. 1 and vice versa. In order make the movable contactor 36 horizontal when it is in its closed position, the adapter 14 is adjusted to put the stationary contactor 16 on the first supporting porcelain insulator 12 at substantially the same level as the hollow terminal 24*a* on the second supporting porcelain insulator 22.

As shown in FIG. 1, the movable contactor 36 put at its closed position forms an angle $\theta$ with that put at its open position. The angle $\theta$ is perferably about 60 degrees.

From the foregoing it is seen that the second supporting porcelain insulator 22 supports, in addition to the breaking portion 24 of the circuit breaker, the driving mechanism 34 for the circuit disconnector and therefore serves as a common supporting porcelain insulator for both the circuit breaker and disconnector.

The driving source 20 is designed and constructed so that, after the circuit breaker has completed the breaking operation, the circuit disconnector performs the opening operation. This measure can easily be accomplished according to usual mechanical techniques and therefore need not be illustrated and described here.

From the foregoing it is seen that the circuit breaker includes the common supporting porcelain insulator 22 disposed on the supporting base 10, the hollow terminal 24*a* disposed on the upper end of the common supporting porcelain insulator 22 to form one terminal of the circuit breaker, the porcelain clad breaking portion 24 of the circuit breaker disposed on the common porcelain insulator 22 through the hollow terminal 24*a*, the other terminal 24*b* disposed at the free end of the breaking portion 24, the movable and stationary contacts 24*d* and 24*c* respectively disposed within the breaking portion 24 to be respectively connected to the terminals 24*a* and 24*b*, and the driving rod 30 extending through the interior of the common supporting porcelain insulator 22 and driven by the driving source 20 to move the movable contact 24*d* toward and away from the stationary contact 24*c* through the linkage 28 disposed within the hollow terminal 24*a*. Further the circuit disconnector includes the common supporting porcelain insulator 22 disposed on the supporting base 10, the hollow terminal 24*a* forming one terminal thereof, the first supporting porcelain insulator 12 disposed on the supporting base 10, the terminal 16*a* disposed at the upper end of the first supporting porcelain insulator 12 to form the other terminal of the circuit disconnector, the stationary contactor 16 connected to the terminal 16, the rod-shaped movable contactor 36 having one end separably engaging the stationary contactor 16 and the other end pivotally secured to the driving mechanism 34 disposed within the hollow terminal 24*a* and the driving rod 32 extending through the interior of the common supporting porcelain insulator 22 and driven by the driving source 20 to move the movable contactor 36 toward and away from the stationary contactor 16 through the driving mechanism 34.

With the circuit breaker and disconnector put in their closed positions, electric power from the feeder line 26 flows along a power passageway traced from the other terminal 24*b* of the circuit breaker, through the now engaged, stationary and movable contacts 24*c* and 24*d* of the circuit breaker, the one hollow terminal 24*a*, the now engaged, movable and stationary contactors 36 and 16 of the circuit disconnector, the other terminal 16*a* of the circuit disconnector and thence to the receiving line 18.

Figure 2:
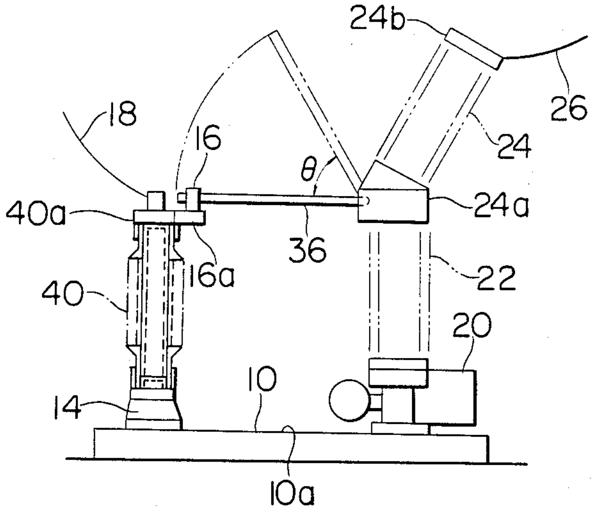
FIG. 2 is a schematic side elevational view of another embodiment of the present invention applied to a power switch assembly comprising a lightning arrester, a circuit disconnector and a circuit breaker.

In FIG. 2, wherein like reference numerals designate the components identical or corresponding to those shown in FIG. 1, there is illustrated another embodiment according to the power switch assembly of the present invention comprising a circuit breaker, a circuit disconnector and a lightning arrester in accordance with another aspect thereof. The arrangement illustrated is different from that shown in FIG. 1 only in that in FIG. 2 a porcelain clad lightening arrester 40 is substituted for the first supporting porcelain insulator 12. The lightning arrester 40 includes a terminal 40*a* disposed at the upper end thereof as viewed in FIG. 2 and connected to both the receiving line 18 and the other terminal 16*a* of the circuit disconnector. In other words, a lightning arrester is clad by the first supporting porcelain insulator 12 and includes the terminal 40*a* located at the upper end of the latter and connected to both the receiving line 18 and the terminal 16*a*.

In FIG. 2 it is noted that only the components 40, 40*a*, 16*a*, 16, 36, 20, 22, 24*a*, 24 and 24*b* are schematically illustrated and the components disposed within the porcelain insulator 22, the hollow terminal 24*a*, and the main breaker body (breaking portion) 24 are omitted.

In the arrangement shown in FIG. 1, the circuit disconnector has the movable contactor 36 horizontally located in its closed position and tilted at about 60 degrees to the horizon in its open position as described above. Also the main breaker body 24 is tilted to the longitudinal axis of the common supporting porcelain insulator 22 to be remote from the disconnector's terminal 16*a*. Thus, an electrically insulating spatial distance is sufficiently maintained between the free end of the movable contactor 36 and the other or upper terminal 24*b* of the circuit breaker. Also the common supporting porcelain insulator 22 is provided at its upper end with the hollow terminal 24*a* serving as both the terminal of the circuit breaker and that of the circuit disconnector, while the upper end thereof supports the driving mechanisms for the circuit breaker and the disconnector. Accordingly, an electrically insulating spatial distance is satisfactorily maintained between the driving mechanism 34 for the circuit disconnector and the upper terminal 24*b* of the circuit breaker as compared with the prior art type power switch assembly comprising the circuit disconnector and breaker disposed in proximity to each other as described above. In addition, it is not required to use a separate porcelain insulator for supporting the driving mechanism of the circuit disconnector previously required. Thus, a comparatively narrow installation area can be sufficient while at the same time the installation is facilitated by not having to install a porcelain insulator for supporting the driving mechanism of the circuit disconnector.

Furthermore, the electrical connection of the circuit disconnector to the circuit breaker is effected simultaneously with the installation thereof. This means that the electrical connection is not required to be effected separately. In addition, since the driving rods 30 and 32 for the circuit breaker and disconnector extend through the interior of the common supporting porcelain insulator 22, the necessary installation area is further reduced and the installation is further facilitated as compared with the case where the driving porcelain insulator of the circuit disconnector is separately disposed as in the conventional power switch assembly described above.

Also, it is to be understood that the site for installing the circuit disconnector should be substantially equal in vertical level to the site for installing the circuit breaker. This is because a difference in the vertical level between the two sites results in the possiblity of generating an unnatural force on each of the mechanical connections or impeding the closure of the circuit disconnector. To this end, the circuit breaker and disconnector are disposed on the common supporting base 10 and the adapter 14 controls the height of the upper end of the first supporting porcelain insulator 12. Therefore, the upper end of the porcelain insulator 12 can easily be vertically positioned with respect to the hollow terminal 24a on the common supporting porcelain insulator 22 regardless of irregularity of the installation site. Also, the movable and stationary contactors 16 and 36 of the circuit disconnector can easily be positioned and put in good engagement with each other without any hindrance. It is noted that in the conventional power switch assembly as described above, no problem is caused due to a difference in level between a site for installing the circuit disconnector and that for installing the circuit breaker. This is because the circuit disconnector is connected to the circuit breaker through the connecting lead which is normally flexible.

It is to be understood that FIG. 1 shows the arrangment for one phase alone and that the power switch assembly actually comprises, in addition to the arrangement of FIG. 1 two other arrangements each identical in structure to that shown in FIG. 1 with the three arrangements juxtaposed in mutually perpendicular directions.

The foregoing is equally applicable to the arrangement of FIG. 2 wherein the stationary contactor of the circuit disconnector is supported by the porcelain clad lightning arrester.

In summary, the present invention provides a power switch assembly comprising circuit disconnector and a circuit breaker electrically connected to each other with or without a lightning arrester electrically connected to the circuit disconnector. The power switch assembly comprises a horizontal supporting base, a supporting procelain insulator or a porcelain clad lightning arrester substantially vertically disposed on the supporting base and including a stationary contactor and a terminal of the circuit disconnector disposed at the upper end thereof, a common supporting porcelain insulator vertically disposed on the supporting base to be spaced from the supporting porcelain insulator or the porcelain clad lightning arrester by a predetermined distance, a driving mechanism for the circuit disconnector supported by the end of the common supporting porcelain insulator to engage and disengage a movable contactor of the circuit disconnector with and from the stationary contactor thereof, and a breaking portion of the circuit breaker supported by the end of the common supporting porcelain insulator and having a movable and a stationary contact disposed therein. Thus, the power switch assembly can be installed in a small area and further facilitate the installation and connection operations. Also, the electrically insulating spatial distance as required can be sufficiently maintained between the circuit disconnector and the breaker. In addition, the resulting structure is simple, inexpensive and easily transported. Furthermore, it is possible to accommodate both a driving rod for operating the driving mechanism of the circuit disconnector and that for operating the circuit breaker within the common supporting porcelain insulator. This results in a further decrease in installation area.

While the present invention has been illustrated and described in conjunction with a few preferred embodiments thereof, it is to be understood that numerous changes and modifications may be resorted to without departing from the spirit and scope of the present invention. For example, the breaking portion of the circuit breaker may be supported by the common supporting porcelain insulator to extend in parallel to the longitudinal axis of the latter in accordance with the voltage class of the circuit breaker.

What is claimed is:

1. A power switch assembly comprising:

a. a horizontal supporting base;

b. a first supporting porcelain insulator disposed on said base so as to extend vertically upward to a free first upper end thereof;

c. a second supporting porcelain insulator disposed on said base horizontally spaced from said first insulator so as to extend vertically upward to a free second upper end thereof;

d. a circuit disconnector, including a stationary contactor and a terminal disposed on said first free end and an elongated movable contactor having a third free end, mounted on said second free end such that said third free end is disengagably engagable with said stationary contactor; and e. a circuit breaker, adjacent to and electrically connected to said circuit disconnector, including a breaking portion mounted on said second free end.

2. A power switch assembly as in claim 1, wherein said movable contactor has an end opposite said third free end, said assembly further comprising driving means for pivotally driving said movable connector into and out of contact with said stationary contactor, said driving means being mounted on said second free end, said movable contactor being pivotally mounted at said end opposite said third free end to said driving means.

3. A power switch assembly as in claim 1, wherein said circuit breaker is mounted on said second free end so as to extend upward tilted from the vertical away from said movable contactor.

4. A power switch assembly as in claim 1, further comprising first and second driving rods extending vertically in parallel relation through the interior of said second insulator, a driving mechanism mounted on said second free end for driving said movable contactor into and out of contact with said stationary contactor, said driving mechanism being connected to and operable in response to movement of said first driving rod for moving said movable contactor, said second driving rod being movably connected to said circuit breaker for opening and closing said circuit breaker.

5. A power switch assembly as in claim 1, further comprising a hollow terminal for said circuit breaker and said circuit disconnector, mounted on said second free end, and a driving mechanism mounted on said second free end for driving said movable contactor into and out of contact with said stationary contactor and for driving said circuit breaker open and closed.

6. A power switch assembly comprising:

a. a horizontal supporting base;

b. a lightning arrester disposed on said base so as to extend vertically upward to a free first upper end thereof;

c. a first supporting porcelain insulator, disposed on said base horizontally spaced from said lightning arrester so as to extend vertically upward to a free second upper end thereof;

d. a circuit disconnector, including a stationary contactor disposed on said first free end and an elongated movable contactor having a third free end, mounted on said second free end such that said third free end is disengagably engagable with said stationary contactor;

e. a circuit breaker mounted on said second free end; and f. an operating mechanism, disposed below said first insulator and connected to said circuit breaker and said movable contactor, to open and close said circuit breaker and engage and disengage said movable contactor with and from said stationary contactor.

7. A power switch assembly as in claim 6, wherein said circuit disconnector further comprises a first terminal disposed on said first free end, said stationary contactor being electrically and mechanically coupled to said first terminal, said circuit breaker having a second terminal disposed on said second free end, said movable contactor being electrically and mechanically coupled to said second terminal.

8. A power switch assembly as in claim 6, wherein said circuit breaker is mounted on said second free end so as to extend upward tilted from the vertical away from said movable contactor.

9. A power switch assembly as in claim 6, further comprising a second porcelain insulator cladding said lightning arrester.

* * * * *

UNITED STATES PATENT AND TRADEMARK OFFICE
CERTIFICATE OF CORRECTION

PATENT NO. : 4,541,033

DATED : September 10, 1985

INVENTOR(S) : Toru SAITO

It is certified that error appears in the above-identified patent and that said Letters Patent is hereby corrected as shown below:

On the title page

In heading, item [73], for "S. Soga & Co.", read --Mitsubishi Denki Kabushiki Kaisha--.

Signed and Sealed this

Fourteenth Day of March, 1989

*Attest:*

DONALD J. QUIGG

*Attesting Officer*

*Commissioner of Patents and Trademarks*